United States Patent [19]

Moseley

[11] 4,310,274

[45] Jan. 12, 1982

[54] LUMBER STACKER AND METHOD

[76] Inventor: Kemper N. Moseley, 1007 Gloria Ave., Durham, N.C. 27701

[21] Appl. No.: 79,473

[22] Filed: Sep. 27, 1979

[51] Int. Cl.³ .............................................. B65G 57/18
[52] U.S. Cl. .......................................... 414/42; 414/87
[58] Field of Search ........................ 414/42, 68, 84, 87, 414/88, 786, 736, 740; 294/87 R, 104

[56] References Cited

U.S. PATENT DOCUMENTS

| | | | |
|---|---|---|---|
| 1,128,671 | 2/1915 | Evans | 414/88 X |
| 1,225,523 | 5/1917 | Surles | 414/42 |
| 3,204,753 | 9/1965 | Moseley | 198/476 |
| 3,508,672 | 4/1970 | Stanoy et al. | 414/87 X |
| 4,054,211 | 10/1977 | Moseley | 414/68 X |

FOREIGN PATENT DOCUMENTS

| | | | |
|---|---|---|---|
| 141624 | 8/1953 | Sweden | 414/42 |
| 1020205 | 2/1966 | United Kingdom | 414/88 |
| 599969 | 3/1978 | U.S.S.R. | 414/42 |

*Primary Examiner*—Leslie J. Paperner
*Attorney, Agent, or Firm*—B. B. Olive

[57] ABSTRACT

A push-on type lumber stacker utilizes a pivoted conveyor for discharging the boards onto the stack and which starting from the outfeed conveyor level pivots upwardly in correspondence with the increasing height of the stack. The pivoted conveyor at its discharge end incorporates a plurality of remotely operable stick holders which hold the sticks as runners during formation of each layer and then release the sticks to serve as layer spacers. A plurality of rotary driven cams are also mounted on the discharge end of the conveyor to assist in pushing the boards onto the sticks.

1 Claim, 6 Drawing Figures

LUMBER STACKER AND METHOD

BACKGROUND OF THE INVENTION

1. Field of the Invention

The invention relates to an apparatus and method for stacking lumber.

2. Description of the Prior Art

A useful history of the piror art is to be found in applicant's prior U.S. Pat. Nos. 3,204,753 and 4,054,211 which are incorporated herein by reference to avoid repetition.

Prior to the present invention, a widely employed practice in lumber stacking has been to discharge the lumber, layer by layer, from a conveyor having a fixed horizontal plane of discharge. Various kinds of elevating apparatus have been used to lower the stack as it is built up and then elevate or lower the finished stack for movement to the next storage or drying station.

U.S. Pat. No. 4,054,211 brought about an improved discharge conveyor by providing a plurality of rotatable cams at the discharge end of the conveyor. However, such cams prior to the present invention were always employed with discharge conveyors operating in a fixed position. Also, the stick holders have always been associated with a discharge conveyor having a fixed position. A remotely operable pivotal stacking conveyor with cams and remotely operable stick holders would thus be desirable.

SUMMARY OF THE INVENTION

The method and apparatus of the invention eliminates raising and lowering of the stack. The stack is formed on a base conveyor by means of a remotely operable pivotal conveyor mounting remotely operable stick holders as the boards are fed from a bulk supply and deck conveyor. Cam-type board pushers are employed at the discharge end of the pivotal conveyor.

DESCRIPTION OF THE PREFERRED EMBODIMENT

Figure 1:
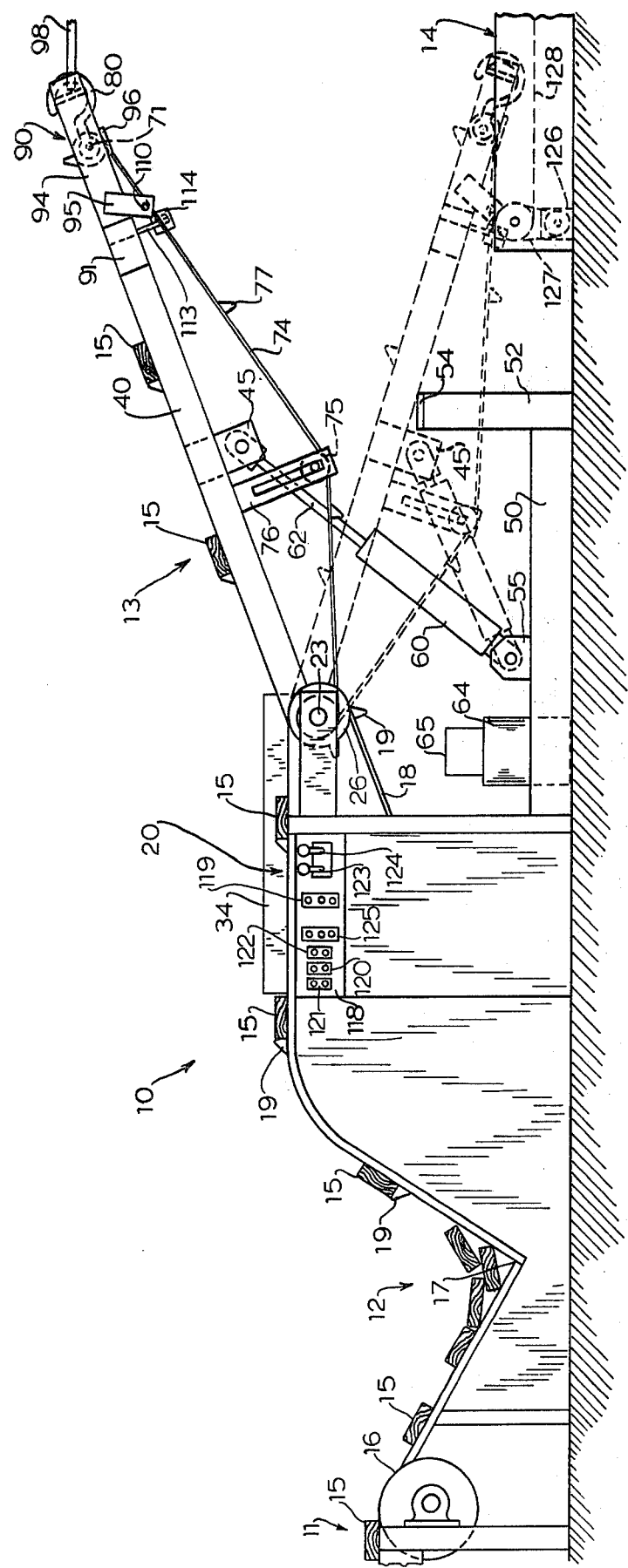
FIG. 1 is a side elevation view of a lumber preparation system incorporating the lumber stacking apparatus of the present invention. The stacker is illustrated in solid lines in its uppermost position and in dashed lines in its lowermost position.
Figure 2:
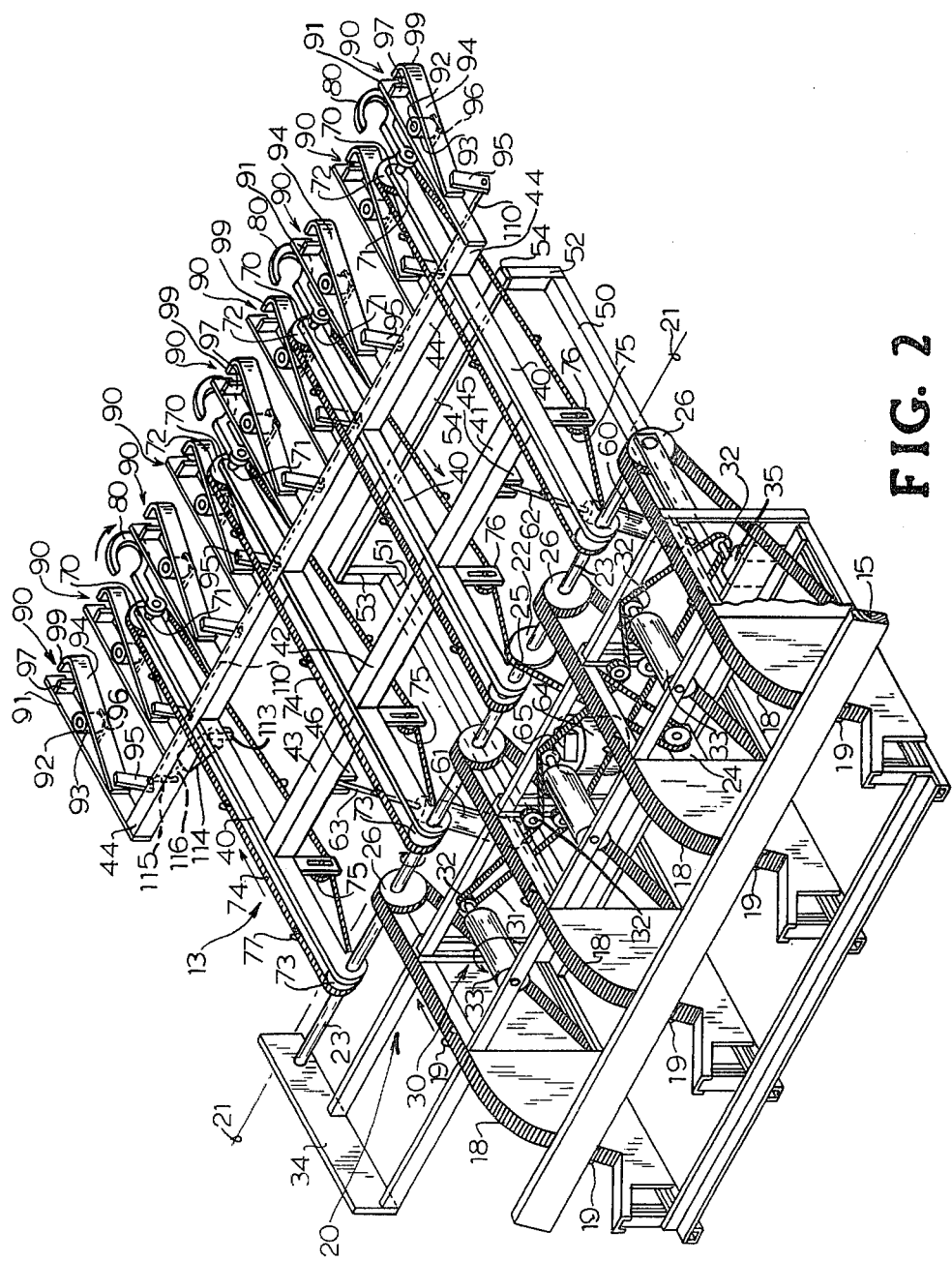
FIG. 2 is a perspective view of the portion of the stacking apparatus incorporating the elevating chain conveyor, cams and stick holders. A portion of the cover has been removed for illustrative purposes.
Figure 5:
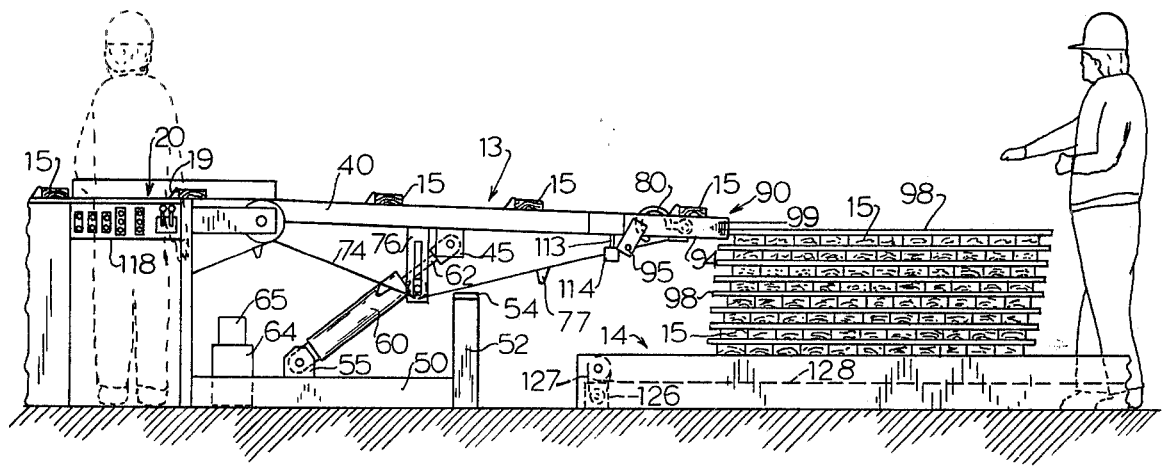
FIG. 5 is a side elevation view similar to that of FIG. 1 but on a reduced scale and illustrating an operator positioned for placement of sticks in the holders and with the elevating conveyor in an intermediate position.
Figure 6:
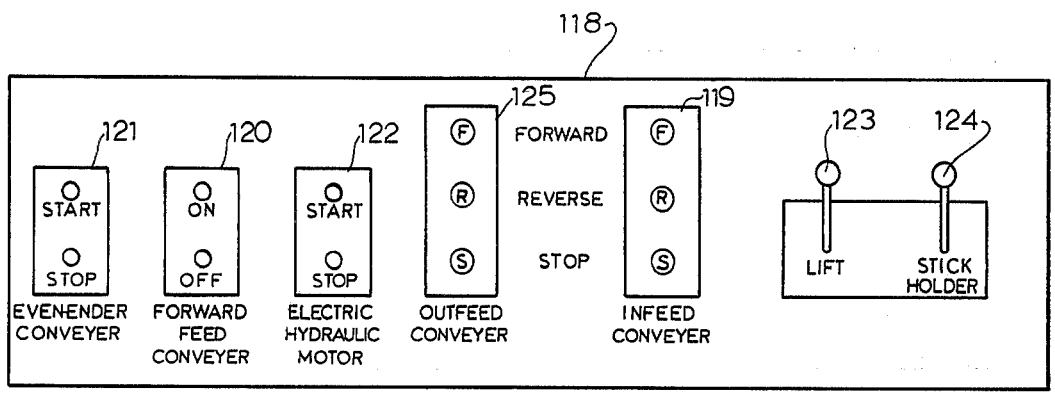
FIG. 6 is a front elevation view of the control panel of the present invention with appropriate labels illustrating the equipment which they control.

Referring to the drawings and in particular to FIGS. 1, 2 and 5, the lumber apparatus 10 of the present invention comprises a lumber deck 11, an unscrambler 12, a pivotal lumber stacker 13, and lumber stacker base 14. Lumber deck 11 and unscrambler 12 are generally of the type disclosed in applicant's previously-mentioned U.S. Pat. Nos. 3,204,753 and 4,054,211, the teachings of which are incorporated herein by reference. According to the well-known operation of deck 11 and unscrambler 12, a bulk supply of boards 15 is placed on deck 11 and moved therealong until boards 15 are discharged from the end of deck 11 where they move over a sprocket 16 and fall by gravity into the V-shaped portion 17 of unscrambler 12. A series of parallel chains 18, each having upwardly extending spaced lugs 19, pass under boards 15 and remove individual boards 15 from V-shaped portion 17. Boards 15 are then transferred upwardly onto a second horizontal deck 20 where they are conveyed in a direction transverse to their longitudinal axes and are discharged from deck 20 at the deck terminal edge portion 21, i.e., at the line connecting the upper surfaces of drive sprockets 26 (see FIG. 2). An even-ender mechanism 30 is composed of drive chain 31 and sprockets 32 which in turn drive even-end rollers 33 so that boards 15 are moved toward wall 34 and abut wall 34 as they move along on chains 18 toward deck terminal end portion 21. Regardless of the lengths of boards 15, one end of boards 15 is always maintained straight. Drive motor 35 powers chain 31 for driving sprockets 32.

For the purposes of the present invention, individual boards 15 are conveyed from terminal portion 21 of deck 20 to the lumber stacking area. Chains 18 are adapted to be driven by a drive sprocket 22 fixedly mounted on a horizontal drive shaft 23 which is, in turn, driven by a motor 24 through appropriate chain 25. Sprockets 26 are fixedly secured to shaft 23 and in turn drive chains 18. All chains 18 are synchronized to move at the same rate of speed. Further details of lumber deck 11 and unscrambler 12 may be found in the above-mentioned U.S. Pat. Nos. 3,204,753 and 4,054,211 and will not be repeated here. Stacking with spacer sticks is a well-known practice.

Turning now to a description of pivotal lumber stacker 13. stacker 13 has four arms 40 which pivot on drive shaft 23 and extend in a direction transverse to the longitudinal axes of boards 15. Connecting bars 41, 42, 43 tie arms 40 together so that they pivot together on shaft 23. Bar 44 extends across the free ends of arms 40 and are integrally secured thereto. A pair of brackets 45 are integrally secured to the bottom of bar 41 and a pair of similar brackets 46 are secured to the bottom of bar 43. Frame members 50, 51 extend outward from the base of the frame of horizontal deck 20. Uprights 52, 53 and connecting member 54 complete the frame structure. Bracket 55 is integrally secured to member 50 and bracket 56 not shown is integrally secured to member 51. Hydraulic cylinder 60 is pivotally secured to bracket 55 and a hydraulic cylinder 61 is pivotally secured to bracket 56 of frame members 50, 51 respectively. Piston 62 of cylinder 60 is pivotally secured at its free end to bracket 45 and piston 63 of cylinder 61 is pivotally secured at its free end to bracket 46. Appropriate supply and return lines, not shown, extend from cylinders 60, 61 to reservoir 64 which contains the hydraulic fluid. Electric hydraulic motor 65 controls cylinders 60, 61. Operation of cylinders 60, 61 and pistons 62, 63 causes pivotal lumber stacker 13 to be raised or to be lowered as needed in the stacking operation and in the lowermost position to rest on member 54.

Arm extensions 70 are integrally secured to bar 44 and extend outward therefrom. Also, extensions 70 are in alignment with stacker arms 40. Each arm extension 70 has a shaft 71 rotatably secured thereon so that it extends through and on each side of arm extensions 70. Shafts 71 receive on one side sprockets 72 so that sprockets 72 are free to rotate with shaft 71. A set of mating sprockets 73, there being four such sprockets, are fixedly mounted on drive shaft 23 adjacent each stacker arm 40. A set of chains 74 are mounted on sprockets 72, 73 and, as best seen and viewed in reference to FIG. 2, are maintained in a drive condition by idler sprockets 75 adjustably and rotatably mounted on adjusting bars 76. As drive shaft 23 rotates, chains 18 and 74 are driven in a clockwise manner. Chains 74 also have lugs 77 integral therewith and, as in the case of lugs 19 of chains 18, which serve to move boards 15 along as chains 74 move forward. As boards 15 move past terminal edge portion 21, boards 15 are moved forward by chains 74 and lugs 77.

On the opposite free ends of shafts 71, cam members 80 are integrally secured to shafts 71. Cam members 80 (FIG. 2) are driven clockwise by movement imparted to chains 18 and 74 by motor 24. Once boards 15 reach the ends of chains 74, they are propelled forward by cam members 80 contacting the back portion thereof.

Figure 3:
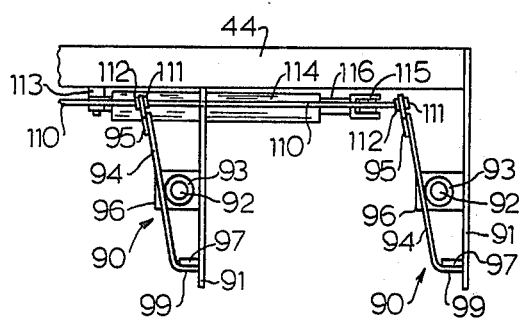
FIG. 3 is a fragmentary plan view of a pair of the stick holders and holder activating piston and linkage. The holders are illustrated in a closed but non-stick holding position.
Figure 4:
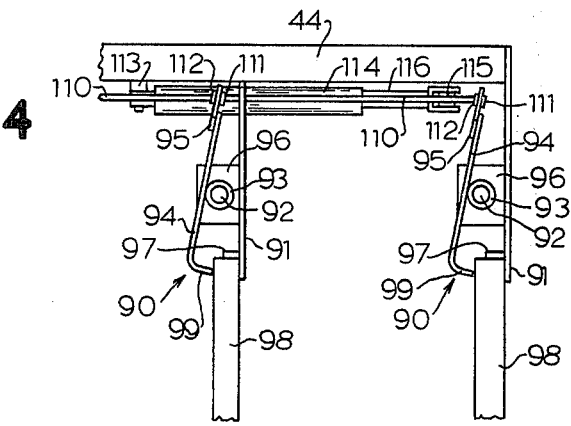
FIG. 4 is a view similar to that of FIG. 3 but illustrating the stick holders holding a pair of sticks in place.

In the preferred embodiment as disclosed, nine stick holders 90 are employed. Stick holders 90 are comprised of fixed arm members 91, pivot pins 92, pivot sleeves 93, pivot arms 94 and angular extensions 95. Arm members 91 are rigidly secured to bar 44 and extend outward therefrom. A mounting plate 96 extends from the bottom of each of members 91 and rigidly mounts pivot pins 92 so that they extend vertically. Pivotal arms 94 have sleeves 93 integrally secured thereto and sleeves 93 mount on pins 92 so that pivot arms 94 in fact do pivot about pins 92. Stop blocks 97 serve to prevent spacing sticks 98 from entering too far into stick holders 90. Bent ends 99 are turned at right angles to pivot arms 94 and abut against the inside wall of fixed arm members 91. As illustrated in FIG. 4, once sticks 98 are put into position between arms 91 and 94, they are maintained in this position until released therefrom. A rod 110 extends through each of angular extensions 95 and is maintained in place by a pair of washers 111, 112 rigidly secured to rod 110 on either side of extensions 95. A bracket 113 is rigidly secured to bar 44 and extends downward therefrom and mounts pivotally thereon at its lower end a cylinder 114. Cylinder 114 pivots about bracket 113 and extends outward at a slight angle with bar 44. A bracket 115 is rigidly secured to rod 110 and extends downward therefrom. Piston 116 of cylinder 114 is pivotally secured at its free end to bracket 115. As piston 116 is moved from cylinder 114, rod 110 is moved forward and in turn moves all of pivot arms 94 to the position as shown in FIG. 4. As piston 116 is moved back into cylinder 114, rod 110 is moved backward and in turn moves all of pivot arms 94 to the position shown in FIG. 3 which closes the stick holders 90. Appropriate supply and return lines, not shown, extend from cylinder 114 to reservoir 64 which contains the hydraulic fluid. Electric hydraulic motor 65 controls cylinder 114. Operation of cylinder 114 and piston 116 through the described linkage causes stick holders 90 to open and close upon manual activation and are remotely operable at control panel 118.

In operation, the lumber apparatus 10 of the present invention has a bulk supply of boards 15 placed upon deck 11 and apparatus 10 is energized. Infeed conveyor sprocket 16 is powered by an appropriate electric motor, not shown, which is activated from control panel 118 by infeed conveyor switch 119. Forward feed conveyor switch 120 is depressed and motor 24 is energized and through sprocket 22 and chain 25 drives sprockets on shaft 23 and drives chains 18. As boards 15 are dumped into unscrambler 12, boards 15 are moved upward on chains 18 and lugs 19 onto horizontal deck 20 and forward to deck terminal edge portion 21. As boards 15 move forward on chains 18, even-ender conveyor switch 121 is activated which starts drive motor 35 and through sprockets 32 and drive chain 31 drives even-ender rollers 33. Rollers 33 cause boards 15 riding forward on chains 18 to be moved toward wall 34 so that one end of boards 15 will be even. As boards 15 reach deck terminal edge portion 21, boards 15 are deposited on chains 74 which have already been set in motion by switch 120. Boards 15 are moved forward on chains 74 by lugs 77. Motor 65 is activated by depressing switch 122 which sets the hydraulic system into operation. While individual spaced apart boards are illustrated on chains 18 and which is desirable in actual practice two or more boards are sometimes stacked one above the other for a set of lugs. In these situations the operator can jog the chains 18 and achieve the desired spaced apart individual boards on chains 74.

Lift lever 123 is manually operated until pivotal lumber stakcer 13 is in the desired elevation through operation of cylinders 60, 61 and pistons 62, 63. While boards 15 are being moved forward by chains 74, stick holder lever 124 is manually operated so that stick holders 90 are opened and a worker manually places sticks 98 into stick holders 90. Once sticks 98 are in place, lever 124 is operated to close holders 90 on sticks 98. As boards 15 reach the forwardmost end of chains 74, cam members 80 engage boards 15 and propel them forward onto sticks 98. Sticks 98 and boards 15 when discharged from stacker 13 are stacked on lumber stacker base 14. When a layer of boards 15 is completed, the system is momentarily stopped and lift lever 123 is manually operated which causes cylinders 60, 61 and pistons 62, 63 to raise stacker 13 to the next level. The system is again energized and boards 15 are again stacked on sticks 98 which have been placed in stick holders 90 once stacker 13 is in position. This operation is continued until a desired height stack of lumber is completed. At this point, outfeed conveyor switch 125 is depressed and which sets base 14 into motion and through motor 126 and chain 127 moves the lumber stack out of the stacking area on chains 128. Approximately 10 seconds is needed to move the completed stack enough so that the system can be set into operation for the next stack. That is, the new stack can be started before the finished stack is completely moved away.

While not illustrated, it is recognized that if desired the stack can be built up on a temporary elevatable support above and clear of the outfeed conveyor and then by hydraulic or similar means lowered onto the outfeed conveyor. This arrangement allows the outfeed conveyor to be operated to move a finished stack throughout the time a new stack is being formed. However, in most applications the illustrated arrangement where the new stack is built up directly on the outfeed conveyor is preferred and meets normal lumber handling requirements.

In summary, as compared to the prior art apparatus and methods, it can be seen that the apparatus and method of the invention offers the following advantages and features:

(1) The time required for lowering the increasingly heavy stack as it is built up has been eliminated.

(2) The time required for raising or lowering the completed heavy stack for moving to the next operation has been eliminated.

(3) A very rapid pivoting of the remotely operated, pivotal and relatively lightweight and light loaded conveyor of the invention is now employed to accommodate to the stack building and stack starting operation instead of the previously practiced steps of lowering and raising the entire stack.

(4) The extremely expensive and heavy stack lowering and stack raising mechanism has been eliminated.

(5) The apparatus and method of the invention provides an essentially completely portable system that can be moved from one site to another with minimum preparation and which eliminates the need for preparing a stack raising and lowering pit and the associated raising and lowering mechanism.

(6) The operator is enabled to operate the pivoting of the conveyor remotely, rapidly and precisely as a new stack builds up and when starting a new stack.

(7) The stick holders are now associated with a pivotal conveyor as distinguished from a fixed conveyor but are nevertheless remotely controllable in all positions of the pivotal conveyor.

(8) The cam members are effective to rapidly and automatically clear the boards from the pivotal conveyor at all stack levels.

(9) The stack can be formed directly on the outfeed conveyor.

(10) Once the stack is completed, it can be rapidly and immediately removed on the outfeed conveyor since stack raising or lowering and the time required for stack raising or lowering has been eliminated.

(11) The sticks can be readily positioned at an appropriate height and horizontally for each level of stacking and can also have their angular relation to the plane of the pivotal conveyor changed as the stack builds up.

(12) the new stack can be started on the outfeed conveyor while the completed stack is being moved away thus saving substantial time.

(13) Maintenance time and cost is reduced since the usual heavy stack elevating and lowering mechanism has been eliminated.

(14) An overall dramatically improved system and method are provided which can be readily associated with conventional lumber deck, unscrambler and evenender apparatus and with appropriate changes in dimensions and operating speeds can accommodate to a wide range of lumber sizes which can be stacked with stick spacers as shown.

What is claimed is:

1. A lumber handling and stacking apparatus comprising:

(a) a first conveyor formed by a fixed frame mounting a first set of parallel sprocket mounted drive chains with evenly spaced lugs thereon for engaging with upper runs of said chains and driving the trailing edge of individual boards received from a bulk supply of boards and for thereafter conveying with upper runs of said chains in a forward elevated portion of the conveyor evenly spaced apart boards along a fixed horizontal plane of travel and in a direction transverse to their longitudinal axes to a forward terminal edge portion for discharge;

(b) a second pivotal conveyor formed by a pivotal frame mounting a second set of parallel sprocket mounted drive chains with evenly spaced lugs thereon for engaging with upper runs of said second set of chains and driving the trailing edge of individual boards discharged by said first conveyor at the said forward terminal edge portion thereof for transfer to an overlapping rear receiving edge portion of said second conveyor and for thereafter conveying with upper runs of said second set of chains evenly spaced apart boards along a pivotal plane of travel and in a direction transverse to their longitudinal axes, said pivotal plane of travel of said second conveyor forming a continuation of said horizontal plane of travel of said first conveyor;

(c) a first conveyor drive shaft mounted on said first conveyor fixed frame and having drive sprockets operatively associated with both said first and second sets of drive chains and mounted on said drive shaft so as to laterally offset the chains of the first set from those of the second set, said drive shaft providing a fixed axis about which said second pivotal conveyor frame pivots and positioned between the said forward terminal edge portion of said first conveyor and the said rear receiving edge portion of said second conveyor to effect the overlapping of said forward terminal edge and rear receiving edge portions of said first and second conveyors;

(d) shaft means mounted on the said frame of said second pivotal conveyor near the discharge end thereof and mounting sprockets for carrying the said second set of chains of said second pivotal conveyor;

(e) remotely controllable means for raising and lowering said second pivotal conveyor for selectively positioning of the said pivotal plane thereof;

(f) a plurality of laterally spaced, releasable stick clamping means mounted on said second pivotal conveyor frame adjacent the forward discharge end thereof and corresponding in number to the desired number of stacking sticks used to separate each layer in the stack of lumber, each said stick clamping means having a fixed clamp surface opposite a movable clamp surface and being adapted when closed to releasably clamp at a position adjacent the discharge end of said second pivotal conveyor and clear of the said sprockets on said second conveyor shaft means a marginal end portion of one of the uppermost stacking sticks between said fixed and movable clamp surfaces and during the forming of a layer of lumber in said stack enabling the plurality of stacking sticks so clamped to be held stationary, horizontal and supported by previously stacked lumber and to serve as temporary stationary runners for supporting and guiding along a horizontal plane the individual boards discharged from said second pivotal conveyor and while said clamping means and sticks are maintained in relative angular relation appropriate to the position of said second pivotal conveyor for the layer of lumber being stacked, and each said releasable stick clamping means being adapted to have its movable clamp surface moved to open and release the plurality of sticks so clamped whereby said second pivotal conveyor may be moved upwardly to the level of the next layer to be formed;

(g) remotely controllable actuating means operatively associated with said stick clamping means and mounted on said second pivotal conveyor adjacent the discharge end thereof for opening and closing the movable clamp surfaces of said releasable stick clamping means in unison;

(h) a plurality of cams mounted on and driven by said second conveyor shaft means at the discharge end of said second pivotal conveyor and being adapted in synchronism with rotation of the sprockets on said shaft means and the movement of the lugs on said second set of chains to engage and push the trailing edge of each individual board forward away from the discharge end of said second pivotal conveyor and beyond the path of travel of said lugs on said second set of chains and in a horizontal plane of delivery; and (i) a stacker base assembly providing means located and adapted to receive the successive layers of lumber during the forming of the lumber stack and to move the completed stack away from the discharge end of said second pivotal conveyor to allow the formation of another successive stack.

* * * * *